UNITED STATES PATENT OFFICE.

SAMUEL LOWY, OF NEW YORK, N. Y., ASSIGNOR OF ONE-HALF TO PINCUS SCHRANK, OF NEW YORK, N. Y.

PAINT.

1,168,730.     Specification of Letters Patent.     Patented Jan. 18, 1916.

No Drawing.     Application filed June 10, 1913. Serial No. 772,749.

*To all whom it may concern:*

Be it known that I, SAMUEL LOWY, a citizen of the United States of America, and resident of New York, in the county of Bronx and State of New York, (whose postoffice address is No. 946 Union avenue, New York, N. Y.,) have invented certain new and useful Improvements in Paints, of which the following is a specification.

This invention relates to a composition of matter which is intended to be used as an addition to ordinary lead paint, whereby a given quantity of lead paint may be increased, so far as its effective covering qualities are concerned, without a corresponding increase in cost.

In the make up of this composition, which I call a "thinner" though this term is not strictly accurate, I employ shellac, white or brown, in powdered form, borax, and caustic soda, or some other equivalent alkali or alkalis; zinc sulfate, or some other suitable drier, which may be omitted from the composition if desired, because it is not strictly essential; and water. I usually employ these materials in about the following proportions:

5 lbs. white or brown shellac (powdered).
6 oz. borax     } or other equivalent
4 oz. caustic soda } alkali or alkalis.
¼ oz. zinc sulfate.
10 gal. water.

The water is brought to a boil first, whereupon the borax and caustic soda are added. The boiling is continued for about one hour, whereupon the shellac and the sulfate of zinc are added, and the boiling continued for fifteen or twenty minutes longer, until all the solid ingredients are thoroughly dissolved and the solution homogeneous. The composition is then cooled and strained and the liquid is ready for use.

In use I usually add one gallon of the composition to one gallon of paint, mixing thoroughly. The resulting mixture is applied in the usual way, and I have found that in using such a mixture the covering qualities, and the brilliancy of coloring, are better than where the usual paint is employed.

I claim:

1. A composition intended for mixture with lead paint and comprising shellac, borax, caustic soda and water, substantially in the proportions described.

2. A composition intended for mixture with lead paint and comprising shellac, borax, caustic soda, zinc sulfate and water, substantially in the proportions described.

3. A composition intended for mixture with lead paint and comprising five pounds of powdered white or brown shellac, four ounces of caustic soda, six ounces of borax, one-quarter ounce of zinc sulfate and ten gallons of water.

In witness whereof, I have hereunto signed my name in the presence of two witnesses.

SAMUEL LOWY.

In the presence of—
NATHAN LEVITCH,
PINAS SCHRANK.

Copies of this patent may be obtained for five cents each, by addressing the "Commissioner of Patents, Washington, D. C."